United States Patent Office 3,362,156
Patented Jan. 9, 1968

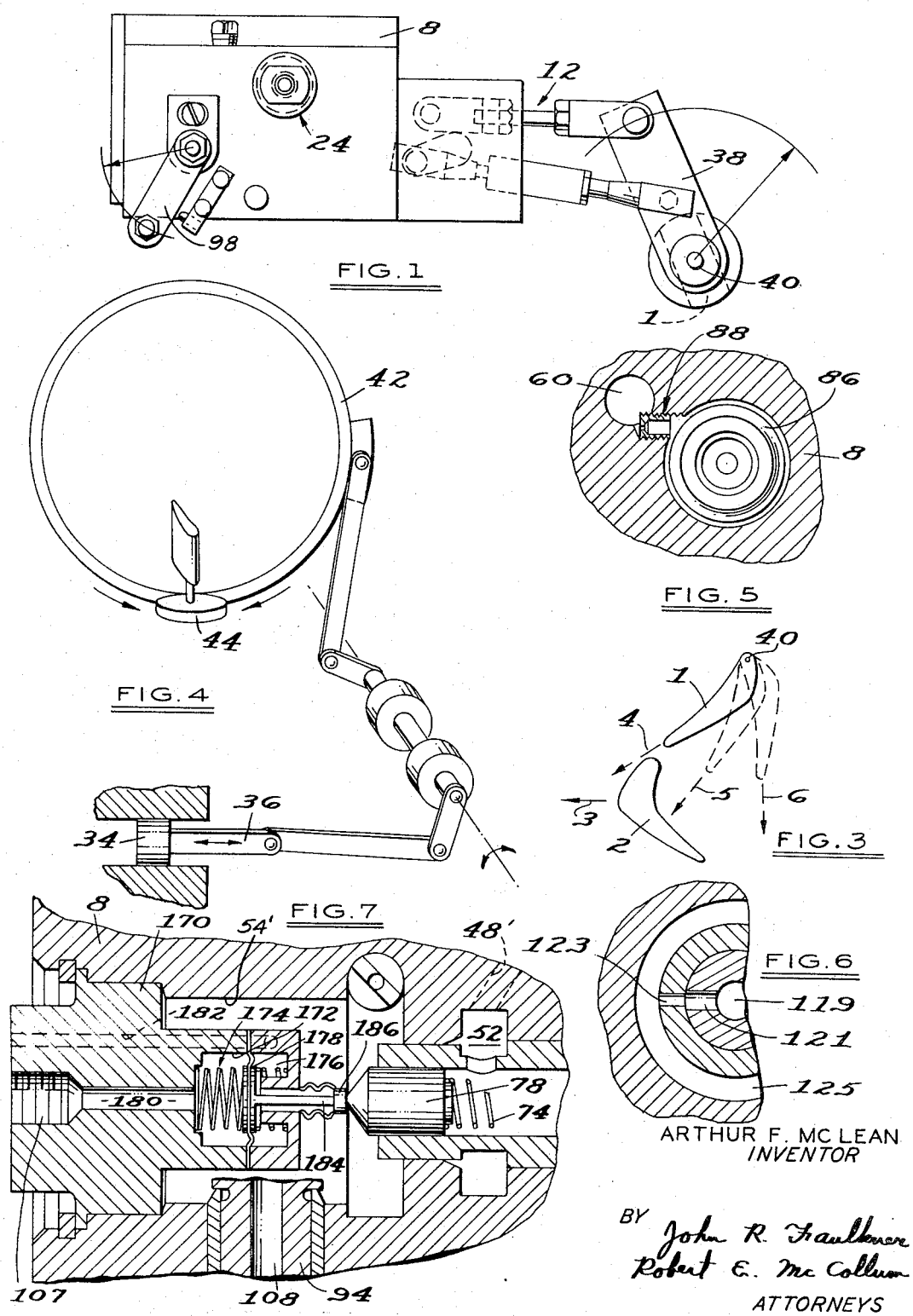

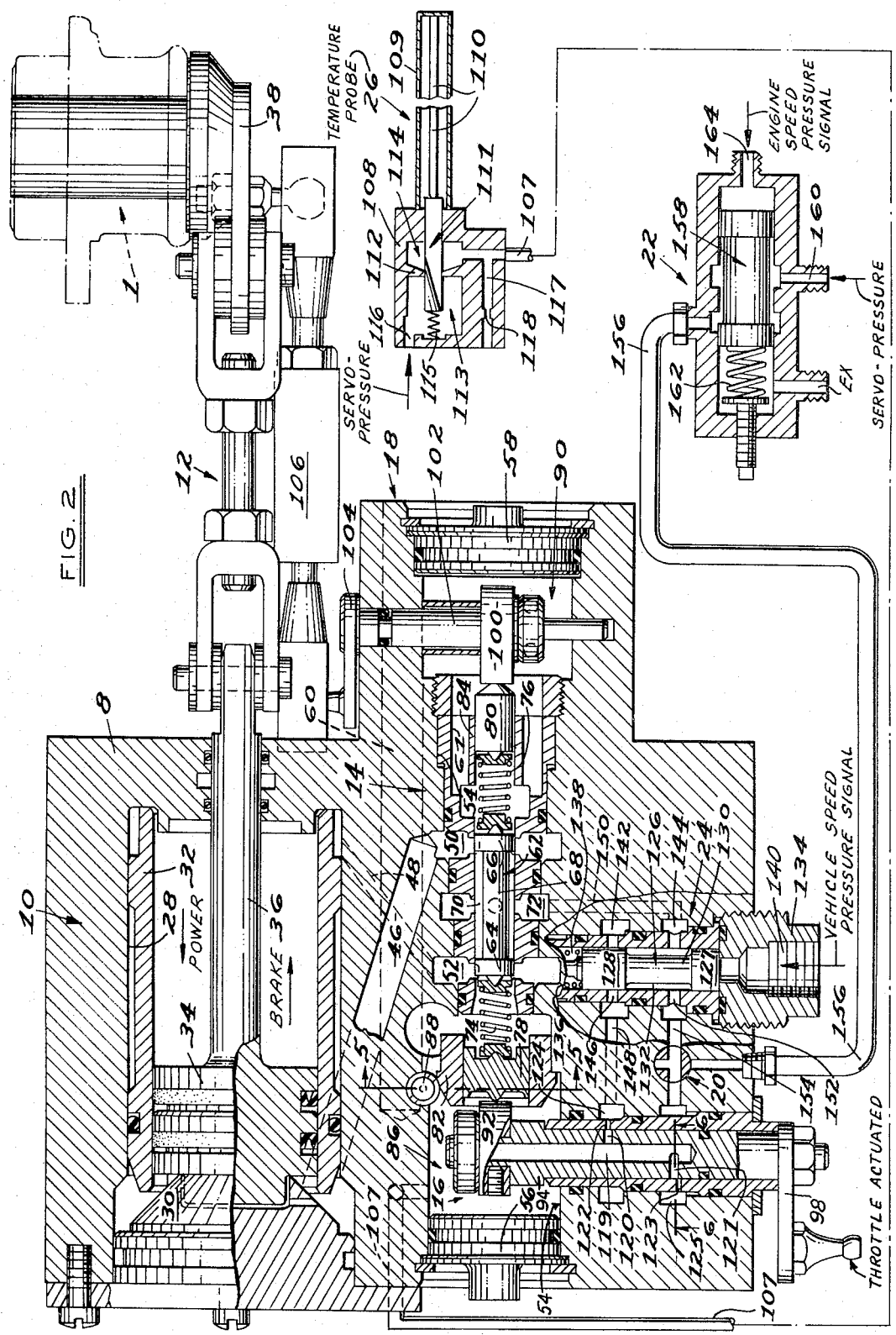

3,362,156
TURBINE NOZZLE ACTUATOR
Arthur F. McLean, Livonia, Mich., assignor to Ford
Motor Company, Dearborn, Mich., a corporation
of Delaware
Filed Dec. 21, 1965, Ser. No. 515,356
20 Claims. (Cl. 60—39.25)

ABSTRACT OF THE DISCLOSURE

A control system, for moving the turbine gas inlet nozzles of a gas turbine engine installed in a motor vehicle between turbine accelerating and braking positions, that consists of; a fluid pressure operated servo device for accurately adjusting the positions of the turbine nozzles; a fluid controlling shuttle mechanism for controlling the movement of the servo; an accelerator pedal control and nozzle motion feedback mechanism for regulating the movement of the shuttle valve; and a number of auxiliary speed and transmission selector lever position control means for braking the rotation of the engine output shaft when the throttle lever is released to its engine idle speed position, or the turbine section temperature rises above a safe operating level; and, of which the following is a specification.

---

This invention relates in general to a fluid pressure control system. More particularly, it relates to a control system for a gas turbine engine that is installed in a motor vehicle.

Motor vehicle gas turbine engines generally provide for a change in the engine output speed by not only controlling the fuel supply, but also by changing the pitch of the power turbine nozzles. The adjustability of the nozzles, therefore, is used as a control for the various acceleration, deceleration and braking phases of operation of the turbine.

From an operator's standpoint, the most desirable method of operating the vehicle is to have essentially only three main controls, namely, the vehicle accelerator pedal, the transmission selector lever, and the vehicle brake pedal. To accomplish this, the nozzle actuator system should provide a precise adustment of the turbine nozzles in accordance with power demand as indicated by the degree of movement of the accelerator pedal so that the engine can be brought up rapidly to and maintained in a particular operating condition, such as, for example, with a constant turbine inlet temperature. Also, the nozzle control system should be capable of automatically decelerating the engine, and indirectly the vehicle speed, when the turbine inlet or exit temperatures rise above a safe level, or the accelerator pedal is released to an idle speed position so that undesirably high turbine inlet temperatures and other conditions will not occur, or uneconomical operation result. Furthermore, the nozzle actuating system should provide some control of the engine to permit operation of the vehicle accessories, such as, for example, the air conditioning, power steering, and other systems, from the engine power output shaft.

The invention satisfies the above requirements by providing a nozzle actuating system that consists, in general, of a fluid pressure operated servo device for accurately adusting the positions of the turbine nozzles; a fluid controlling shuttle mechanism for controlling the movement of the servo; an accelerator pedal control and nozzle motion feedback mechanism for regulating the movement of the shuttle valve; and a number of auxiliary control means for braking the rotation of the engine output shaft when the throttle lever is released to its engine idle speed position, or the turbine section temperature rises above a safe operating level.

It, therefore, is a primary object of the invention to provide a turbine nozzle pitch adjusting mechanism that will at times automatically control the attitude of the nozzles as a function of turbine section temperature and engine and vehicle output shaft speeds, and the position of the transmission selector lever.

Another object of the invention is to provide a control system of the type above consisting of a fluid pressure actuated servo mechanism for controlling the attitudes of the turbine nozzles, the direction of movement of the servo mechanism being controlled by a reciprocating member movable in proportion to the movement of the vehicle accelerator pedal.

A further object of the invention is to provide a control system of the type above including a power feedback means for automatically maintaining the nozzles in the position called for, while at the same time readying the system for immediate further movement of the nozzles to new positions, if desired.

A still further object of the invention is to provide a control system of the type described above in which the engine output shaft is braked when the vehicle throttle pedal is released to an engine idle speed position.

Other objects, features and advantages of the invention will become apparent upon reference to the succeeding, detailed description thereof, and to the drawings illustrating the preferred embodiment thereof; wherein, FIGURE 1 is a side-elevational view of a turbine nozzle actuating system embodying the invention;

FIGURE 2 is an enlarged cross-sectional plan view, with parts broken away and in section, of the nozzle actuating system shown in FIGURE 1;

FIGURE 3 is a schematic cross-sectional view of a turbine nozzle and turbine blade;

FIGURE 4 is a schematic illustration of a control assembly;

FIGURES 5 and 6 are cross-sectional views of details taken on planes indicated by and viewed in the direction of arrows 5—5 and 6—6, respectively, of FIGURE 2; and FIGURE 7 is a schematic cross-sectional view of a modification of the FIGURE 2 construction.

FIGURES 1 and 2 show one view of a turbine nozzle control that embodies the invention. It would be secured as an accessory to the housing (not shown) of a gas turbine engine (also not shown). The details of the gas turbine engine are not given since they are known and are believed to be unnecessary for an understanding of the invention. Suffice it to say that the engine would have one or more conventional axial flow type compressor and power turbines, and that the stationary power turbine nozzles indicated schematically at 1 would be positioned between the usual diffuser section and power turbine rotor blades 2 (FIGURE 3) to control the direction of discharge of combustion product gases to effect the desired rotation of the turbine rotor or rotors.

FIGURE 3 shows, schematically, the cooperation between a typical turbine nozzle 1 and an axial flow turbine blade 2. The range of movement of the nozzle for rotation and acceleration of turbine blade 2 in the direction of arrow 3 is indicated in general by dotted lines 4 and 5. When the nozzle moves between these positions, the gas will discharge against the back side of turbine blade 2 and thus rotate it forwardly.

During the initial accelerating phase of the motor vehicle, the nozzles 1 will be moved clockwise progressively towards the full line position 4 as a function of the position of the vehicle accelerator pedal to provide rotation of the turbine and engine output shaft as called for. On the other hand, if the turbine inlet or exit temperature is excessive, or the vehicle operator releases the accelerator pedal, such as, for example, during vehicle deceleration or engine idle speed operation, the nozzles 1 will be pivoted progressively backwards toward the dotted line braking position 6 so as to change the direction of discharge of the gases from the nozzles to strike the front portions of the turbine blades to thereby retard rotation of the rotor blades 2 in the forward direction. Retarding the power turbine rotation will, of course, retard the engine output shaft rotation since they normally are interconnected by suitable reduction gearing, not shown.

FIGURE 2, which is essentially to scale, shows the details of the control system. It includes, in general, a combined housing and valve body 8; a servo mechanism 10 that is operatively connected by suitable push-pull type linkage 12 to the turbine nozzles 1; a shuttle valve mechanism 14 that controls the flow of fluid to operate servo mechanism 10; an accelerator pedal rotated throttle valve member 16 for controlling the movement of shuttle valve mechanism 14; a power feedback mechanism 18 for rearming the shuttle valve mechanism by returning it to a neutral position when the nozzles move to the position selected; an operator-controlled transmission selector control valve 20 for effecting rotation of the nozzles to brake the power turbine when the vehicle transmission is in neutral; and three controls for braking the engine output shaft at times, namely, an engine output shaft speed sensitive valve means 22; a vehicle speed sensitive valve 24, and a turbine section temperature sensitive means 26.

More specifically, servo mechanism 10 includes a stepped diameter cylindrical bore 28 closed at one end by a conically-shaped cap 30 that abuts and locates a cylindrical sleeve 32. The sleeve encloses an annular piston 34 having an actuating rod 36 that projects through housing 8 to a connection with linkage means 12. The linkage in this particular case, as best seen in FIGURE 1, rotates a lever 38 that is fixed in a suitable manner to turbine nozzle 1 to rotate it about its pivot point 40 (FIGURE 3). In practice, the nozzles would all rotate as a unit, in a manner similar to that shown in FIGURE 4; that is, the piston rod would rotate a ring gear 42 in mesh with a gear 44 secured to each nozzle.

Piston 34 is reciprocated in opposite directions by alternately admitting fluid under pressure to opposite ends of the bore of sleeve 32 through suitable passages 46 and 48. These latter passages are connected to a pair of annular fluid manifolds 50 and 52 that are controlled by shuttle valve mechanism 14.

The shuttle valve mechanism is mounted in a stepped diameter bore 54 that is closed at opposite ends by caps 56 and 58. The bore has a main drain passage 60 connected to a sump, not shown. The bore also has a sleeve member 61 that slidably and sealingly supports a spool valve 62. The spool valve is of a known type having spaced lands 64 and 66 interconnected by a neck portion 68 to define a fluid annulus 70. The annulus is connected at all times to an annular fluid pressure supply passage 72 that is supplied with fluid under pressure from any suitable source, not shown, whenever the engine compressor is driven.

Spool valve 62 is normally positioned in a central or neutral position blocking flow of fluid from passage 72 to either of the servo passages 46 and 48. The shuttle valve is urged towards this position by a pair of centering springs 74 and 76 that are seated against cam followers 78 and 80. The cam followers are slidably mounted within suitable sleeves 82 and 84 non-movably fixed in the valve body.

The bore 54, cap 56, sleeve 82 and left-hand cam follower 78 together define a fluid chamber 86. The chamber is essentially closed except for controlled orifice connection 88 (see FIGURE 5) to main drain passage 60, for a purpose to be described later. Right-hand cam follower 80, together with bore 54, sleeve 61 and cap 58, form a second chamber 90 that is connected at all times to drain passage 60.

Left-hand cam follower 78 abuts against the profiled surface of a cam 92 that is fixed for rotation with the throttle valve member 16. This member projects into fluid chamber 86 and includes a shaft 94 that is rotatably mounted within a sleeve 96 fixed within housing 8. Shaft 94 is connected at its opposite end to a lever 98 that is adapted to be connected to the conventional motor vehicle accelerator pedal linkage (not shown) so that movement of the accelerator pedal will swing lever 98 by a proportionate amount.

The right-hand cam follower 80 abuts against the profiled surface of a cam 100 that is fixed for rotation with a power feedback control shaft 102. This shaft, at its opposite end, is suitably connected by a lever 104 and push-pull linkage 106 to the radially inner portion of lever 38 (FIGURE 1) that is rotatable with the turbine nozzles 1. This construction transmits the nozzle rotation back through cam 100 to shuttle valve 62 to return it to its neutral position to maintain the piston 34 in the position selected by the position of throttle valve member cam 92.

With the construction as thus far described, the valve assembly will provide for accelerating and decelerating positions of nozzles 1 in accordance with the movement of the vehicle accelerator pedal and rotation of throttle valve member 16. As stated previously, however, other controls are also desired for preventing excessive turbine section temperatures, and excessive engine output shaft speeds when the transmission is in neutral condition and/or the vehicle accelerator pedal is released to an engine idle speed position.

Consider first the control to aerodynamically brake the power turbine when the turbine inlet or exit temperature rises above a desired value. Left-hand fluid chamber 86 is connected at all times to a fluid conduit 107 that contains a signal fluid pressure supplied by the temperature sensing means or probe 26. This latter means includes a housing 108 having a hollow probe 109 of high expansion material enclosing and confining a stem 110 of low expansion material. Stem 110 is abutted by a needle-like valve member 111 that slides through an aperture 112 connecting two fluid chambers 113 and 114, and is biased against stem 110 by a spring 115.

Chamber 113 is connected by a line 116 to a source of regulated fluid under pressure, which could be a branch of main supply port 72. Chamber 114 is connected to line 107. Housing 108 also contains a fluid return line 117 having a fixed bleed orifice 118 permitting a pressure build-up in chamber 114 and line 107.

The thermal sensitive probe 109 would be inserted in the turbine section of the engine, either at the gas inlet or exit portions, or both, as desired, so as to sense the changes in gas temperature therein.

In operation, if the turbine gas temperature rises above a safe operating level, the probe outer housing 109 will expand relative to stem 110 and thereby permit spring 115 to move valve 111 to the right to increase the fluid flow between chambers 113 and 115 and line 107. Assuming a correct size of orifice 88 in shuttle valve chamber 86, the increased flow into chamber 86 will cause a pressure build-up sufficient to move cam follower 78 to the right away from throttle member cam 92. This will cause shuttle valve 62 to move to the position shown, or beyond, to supply fluid through servo line 46. Piston 34 will then be moved to rotate the turbine nozzles 1 towards the open braking position 6. The resultant opening movement of the turbine nozzles, with respect to the gas passage, will decrease the turbine temperature and simultaneously slow down the turbine.

Consider now the control to brake the turbine and thereby indirectly retard creep of the vehicle during engine idle speed operation, when the transmission is engaged for a drive condition. Throttle member shaft 94 has a central bore 119 that is open at one end to chamber 86, and has restricted crossbores 120 and 121 of different sizes. The bores 120 and 121 are adapted to cooperate with different size orifices 122 and 123 in sleeve 96 that are connected at all times to annular fluid manifolds 124 and 125. As best seen in FIGURE 6, the crossbores of shaft 94 are so arranged that when the shaft is rotated by the vehicle accelerator pedal to the engine idle speed position shown in FIGURE 6, the shaft crossbores 120 and 121 will be aligned with the flow restricting orifices 122 and 123. Thus, any fluid under pressure in the manifolds 124 and 125 will have a controlled flow into the central bore 119 and out into chamber 86 to pressurize the chamber and move cam follower 82 away from cam 92. The degree of pressurization of chamber 86 will again, of course, depend upon the size of the drain orifice 88, and whether both manifolds 124 and 125 contain fluid, or just one.

The supply of fluid to manifolds 124 and 125 is controlled by the vehicle speed sensitive valve mechanism 24, the transmission selector lever valve 20, the engine output speed sensitive valve 22. Valve mechanism 24 includes a spool valve 126 slidably mounted within a sleeve fixed in the valve body or housing 8. The spool valve has spaced lands 127 and 128 interconnected by a neck portion 130 defining an annular fluid chamber 132. The valve is biased to the position shown against an adapter plug 134 by a spring 136, the chamber 138 containing the spring being vented to exhaust through a port not shown. The opposite end of the valve is adapted to be moved upwardly by fluid under pressure admitted through a passage 140 from a vehicle output shaft speed sensitive source of fluid under pressure (not shown) that develops a pressure that changes with changes in vehicle speed.

The valve body for valve 126 has annular manifolds 142 and 144. Manifold 142 is connected by ports 146 to the valve bore and by a passage 148 to throttle valve manifold 124. Manifold 144 is connected by a passage 150 to main fluid supply passage 72 and by ports 152 to the valve bore. Manifold 144 is also connected by passage 154 past selector lever control valve 20 to throttle valve manifold 125.

In the position shown, valve 126 connects fluid under pressure from line 150 directly to throttle member manifold 125, when valve 20 is in the position shown. When the vehicle output shaft speed is above a predetermined value, the pressure in line 140 raises valve 126 so that fluid will also flow through passage 148 to the throttle valve manifold 124.

Valve 20 provides the transmission selector lever control of the nozzle position. This valve has a 90° rotation between two positions permitting flow to throttle valve member manifold 125 either from the vehicle speed sensitive valve 126 through line 154, or from the engine output shaft speed sensitive valve 22 through a line 156. Valve 20 would be connected to the vehicle transmission selector lever by suitable linkage, not shown. Moving the selector lever to a drive position would move valve 20 to the position shown. Moving the selector lever to a neutral position would rotate the valve 90° counterclockwise to connect the throttle valve manifold 125 to line 156.

The engine output shaft speed sensitive valve mechanism 22 includes a spool valve 158 slidably mounted in the valve body to control flow of fluid under pressure to line 156 from a branch 160 of main supply line 72. The valve is normally biased to the right by a spring 162 to close line 156, and is moved to the position shown by a signal fluid pressure in a line 164 that increases as a function of the increase in speed of a fluid pressure governor or other suitable member driven by the engine output shaft.

The over-all operation is as follows: Assume that the engine is inoperative, throttle lever 16 is released to its idle speed position, and the transmission selector lever is in a neutral position with valve 20 connecting valve 22 to throttle member 16. The servo piston 34 will be in some relative position, which may or may not position the nozzles in their braking position. If the engine is then started, the immediate effect is to provide pump pressure in line 150 leading through the vehicle speed sensitive valve 24. However, since valve 20 is rotated 90° to the left from the position shown (i.e., transmission selector lever in neutral) no flow of fluid under pressure can be made through the line 154 to the bore of throttle member 16, even though the throttle member is in its idle speed position. Therefore, at this time, servo piston 34 will remain in its original position. Therefore, if it is in a turbine accelerating position, the engine speed will begin to increase.

If the engine output shaft speed should now, for some reason, increase beyond the idle speed limit set for valve 22, fluid under pressure will then be connected between lines 154 and 156 and flow past open valve 20 into the bore of the throttle valve member 16 and act on shuttle valve 62 to direct fluid to servo piston 34 to move it towards the turbine braking position. This will reduce the engine output shaft speed and close the cycle. The degree of braking, of course, will vary with the pressure of the fluid. That is, the greater the overspeed beyond the desired level, the greater the degree of braking. Therefore, the control system will now be in a condition to provide engine output shaft braking, even with the transmission selector lever in the neutral position. Also, if the engine temperature should increase beyond the desired level, braking will be provided by the supply of fluid under pressure to chamber 86 from temperature sensitive valve 26, to act on shuttle valve 62.

Assume now that the operator moves the transmission selector lever to drive position. This moves valve 20 to the position shown, and connects the fluid in manifold 144 of valve 126 to the throttle valve shaft bore 119 through orifice 123 and port 121. Fluid will then pressurize chamber 86 a predetermined amount sufficient to maintain the engine output shaft braked in substantially the same manner as described above.

If the operator now depresses the accelerator pedal, all communication of fluid to chamber 86, except that from temperature control 26, is immediately cut off, thus permitting the chamber to be drained through the orifice 88 and relieve the pressure build-up against cam follower 78. The progressive or quick depression of the accelerator pedal now rotates throttle shaft 94 and cam 92 to relieve the pressure on cam follower 78 and spring 74 and permit opposite centering spring 76 to move shuttle valve 62 to the left. This opens servo passage 48 to supply port 72, while connecting servo line 46 to drain line 60 through the right end chamber 90. Piston 34 thus moves progressively to the left and rotates nozzles 1 to their closed, turbine accelerating positions 5 and 4. As the nozzles rotate, the feedback exerted through linkage 106, 104 and shaft 102 rotates cam 100 to relieve the force on cam follower 80 and spring 76. The shuttle valve 62 thus begins to move back towards a neutral position under the influence of spring 74. The fluid supply to servo passage 48 thus is progressively cut off and finally terminated when the nozzles 1 have reached the accelerating position corresponding to the degree of depression of the accelerator pedal and rotation of throttle control member cam 92.

It will be clear that if the driver should partially release the accelerator pedal, that rotation of cam 92 in the opposite decelerating direction will cause a reverse operation of the shuttle valve mechanism. That is, shuttle valve 62 will be moved to the right to connect supply port 72 and servo passage 46 so that piston 34 will be moved to actuate the nozzles to a lesser accelerating position, depending upon the new position of the accelerator pedal.

If, after the vehicle has been accelerated, the operator should completely release the accelerator pedal to its idle speed position, both orifices 122 and 123 in throttle valve shaft 94 are opened to control passages 148 and 154. If the vehicle speed is above a predetermined value, valve 126 will have been moved upwardly by the speed sensitive fluid pressure in line 140 so that fluid under pressure in line 150 now is supplied through both lines 148 and 154, thereby pressurizing chamber 86 to a high value. This moves cam follower 78 and shuttle valve 62 to the right causing piston 34 to move in a rightward direction to actuate the nozzles 1 to their maximum turbine braking positions.

If, at the same time, the transmission selector valve 20 should be moved to a neutral position (rotated 90° to the left), supply of braking pressure to the throttle member manifold 125 from valve 126 through line 154 would be cut off; however, manifold 125 would now be supplied from line 156, if we assume the engine output shaft speed is above the set value. The engine output shaft would then again be braked. Of course, if the engine output shaft speed is below the set level but the vehicle speed is not, flow through the upper passage 148 alone is still sufficient to rotate the nozzles towards their turbine braking positions when the accelerator pedal is in its engine idle speed condition.

Control of the nozzle position by the turbine gas temperature sensitive probe 26 has already been described, and, therefore, is not repeated.

FIGURE 7, illustrates a modified construction incorporating a mechanical temperature change responsive actuator into chamber 86 to act against cam follower 78, and thereby eliminate the need for fluid pressure per se in chamber 86 for this particular control. In this case, the upper part of throttle member shaft 94 has been broken away for clarity.

The housing bore 54' in FIGURE 7 is closed by a plug 170 having a bore 172 divided into two chambers 174 and 176 by a diaphragm 178. Chamber 174 is connected by a bore 180 to the temperature signal pressure line 107 leading from the temperature probe 26 (FIGURE 2). Chamber 176 is vented to the atmosphere through a passage 182. The diaphragm is normally centered by opposing springs, as shown, and is fixed to the stem 184 of an actuator 186 that abuts cam follower 78.

In order not to interfere with the abutment of throttle member cam 92 (FIGURE 2) against cam follower 78, the actuator 184, 186 could be a yoke that would extend on opposite sides of the cam 92, and therefore permit independent actuation by either.

The operation is believed to be clear, increases in pressure in line 107 upon increases in turbine inlet or outlet temperature, as the case may be, moving the actuator 184 to the right to move the cam follower away from throttle member cam 92. This moves the shuttle valve to actuate the nozzles in the same manner as previously described in conection with a description of temperature probe 26.

From the foregoing, therefore, it will be seen that the invention provides a control system for a motor vehicle gas turbine engine that provides orientation of the turbine inlet nozzles as a function of the position of the vehicle accelerator pedal and the turbine section temperature; and that it provides engine braking whenever the turbine section temperature is excessive or the accelerator pedal is released to its idle speed position, and the vehicle speed is above a predetermined value, or the transmission selector lever is placed in neutral position and the engine output shaft speed is above a desired value.

The invention thus provides many advantages; namely, the turbine nozzles can be positioned accurately to maintain given engine operating conditions; any schedule of nozzle positions can be accommodated by correct profiles of the cams on the throttle member and feedback mechanism; idle and braking positions of the nozzles can be achieved separate from the requirements for maintaining given engine conditions; the servo shuttle valve action achieves fast response; the vehicle automatic transmission can be placed in neutral at engine idle speed operation; while the transmission is in neutral or park or start condition, the engine output shaft speed is governed, thereby preventing an overspeed of the engine and maintaining the gear noise level and other members to an acceptable level and permitting a driving of the accessories, such as air conditioning, from the engine output shaft; the engine will be easier to start, and a smaller starter motor can be used because the transmission can be placed in neutral; a manual transmission can be used with the gas turbine engine; and, the engine will not suffer the large temperature and surge changes associated with changes in accessory power because the accessories can be driven while the transmission is in neutral.

While the invention has been illustrated in its preferred embodiments, it will be clear to those skilled in the arts to which the invention pertains that many changes and modifications may be made thereto without departing from the scope of the invention.

I claim:

1. An actuating system for controlling the position of a movable turbine vane in a gas turbine engine for use in a motor vehicle and having a fuel control throttle member movable from an engine idle speed position to an engine accelerating position, comprising, in combination, a fluid pressure actuated servo device operably connected to said vane to move it between turbine accelerating and braking positions, a main source of actuating fluid under pressure connected to said servo device, a reciprocable shuttle valve controlling the flow of fluid from said source to said servo and movable in opposite directions from a neutral non-supply position to positions supplying actuating fluid under pressure respectively to opposite sides of said servo device, said throttle member having means thereon operatively connected to said shuttle valve for moving said valve from its neutral position, feedback control means operatively connected between said vane and shuttle valve for returning said valve to a neutral position upon movement of said vane, and further means operatively connected to said throttle member and shuttle valve for effecting a movement of said vane to a braking position upon movement of said throttle member to an idle speed position, said throttle member and portion of said shuttle valve cooperating therewith having associated therewith a pressurizable fluid pressure chamber, said throttle member having means thereon communicating fluid under pressure to said chamber when said throttle member is in the idle speed position to pressurize said chamber and operatively act on and move said shuttle valve to effect a movement of said vane to a braking position.

2. An actuator mechanism as in claim 1, said further means including a selectively movable valve means movable to a plurality of positions, said valve means in one position communicating fluid in one path from said source to said throttle member, and in a second position communicating fluid in a second path to said throttle member.

3. An actuator mechanism as in claim 1, said further means including an engine speed sensitive on-off valve means controlling the supply of fluid through said second path from said source to said throttle member and being movable in response to a predetermined speed of said engine to supply fluid to said selectively movable valve means, said latter valve means in a second position blocking the flow through said one path while permitting flow through said second path.

4. An actuator mechanism as in claim 1, wherein the speed sensitive valve means is acted upon by a second source of fluid under pressure that varies as a function of the change in engine speed for moving said valve means to an on position upon the attainment of a predetermined speed of said engine to thereby supply fluid from said source to said selectively movable valve means.

5. An actuator mechanism as in claim 1, said one path including a vehicle speed sensitive valve controlling flow of fluid between said source and said selectively movable means and also controlling flow from said source to said throttle member through a bypass fluid conduit and being movable in response to a predetermined vehicle speed change from one position communicating fluid through said one path to said selectively movable means to a second position communicating fluid both to said selectively movable means and said throttle member through said one path and bypass conduit.

6. An actuating system for controlling the position of a movable turbine gas inlet nozzle in a gas turbine engine for use in a motor vehicle and having a fuel control throttle member movable from an engine idle speed position to an engine accelerating position, comprising, in combination, a fluid pressure actuated servo device operably connected to said nozzle to move it between turbine accelerating and braking positions, a main source of actuating fluid under pressure, conduit means connecting said source to said servo device, a reciprocable shuttle valve positioned across said conduit means controlling the flow of fluid from said source to said servo and movable in opposite directions from a neutral non-supply position to positions supplying actuating fluid under pressure respectively to opposite sides of said servo device, centering spring means biasing said shuttle valve to its neutral position, said throttle member having cam means thereon operatively connected to said shuttle valve through one of said spring means for effecting movement of said valve from its neutral position, feedback control linkage means operatively connected between said nozzle and shuttle valve and having cam means thereon acting through another of said spring means on said valve for effecting a return movement of said valve to a neutral position upon movement of said nozzle, and fluid pressure control means operatively connected to said throttle member and shuttle valve for effecting a movement of said nozzle to a braking position upon movement of said throttle member to an idle speed position, said fluid pressure control means including a fluid pressure chamber operatively associated with one end of said shuttle valve whereby fluid under pressure admitted to said chamber operatively moves said shuttle valve independently of said throttle member to effect movement of said nozzle to a braking position.

7. An actuating system as in claim 6, wherein said chamber has a controlled fluid vent line to control the fluid pressure build-up in said chamber, said throttle member having a valve portion thereon movable with said member, said valve portion in the engine idle speed position of said throttle member permitting the communicating of fluid through a pair of paths from said source to said chamber, said control means including further means for controlling the flow of fluid from said source through either or both of said paths to vary the movement of said nozzle towards its braking position.

8. An actuating system as in claim 7, wherein said further means includes a first valve between said source and both of said paths, said first valve being movable from a first position connecting said source and one path to a second position connecting said source and both of said paths, means biasing said first valve to its first position, and means for moving said first valve to its second position.

9. An actuating system as in claim 8, wherein said means for moving said first valve to its second position comprises speed sensitive means responsive to a predetermined speed of said motor vehicle for moving said first valve to its second position.

10. An actuating system as in claim 8, wherein said means for moving said first valve to its second position comprises a second source of fluid under pressure that varies as a function of the change in speed of said motor vehicle to move said first valve to its second position upon the attainment of a predetermined second source fluid pressure level against said first valve.

11. An actuating system as in claim 8, wherein said further means includes a selectively movable second valve in said one of said paths movable to one position to connect fluid from said source to said throttle member through said first valve regardless of the position of said first valve and movable to a second position to block flow from said first valve to said throttle member while simultaneously permitting flow of fluid from said source to said throttle member through a third path connected to said one path.

12. An actuating system as in claim 11, wherein said third path includes a variably movable on-off third fluid control valve controlling the flow of fluid from said source to said second valve, means biasing said third valve to a position blocking flow through said third path, and means responsive to a predetermined speed of said engine for moving said third valve towards an on position to communicate fluid to said third path.

13. An actuating system as in claim 12, wherein said means responsive to the speed of said engine comprises a third source of fluid under pressure acting on said third valve with a pressure that varies as a function of the speed of said engine.

14. An actuating system as in claim 13, said throttle member having other portions blocking flow through said paths to said chamber when said throttle member is moved to its engine accelerating positions.

15. A fluid pressure actuating mechanism comprising, in combination, a member variably movable to a plurality of positions, a reciprocable fluid pressure servo mechanism connected to and moving said member, a source of fluid under pressure connected to and moving said servo mechanism, a shutting means between and controlling the fluid flow from said source to said servo mechanism and movable in opposite directions from a neutral non-fluid supply position to positions supplying actuating fluid under pressure to opposite portions of said servo mechanism, and control means to control the movement of said shuttle means, said control means including selecting means selectively movable to a plurality of positions to effect a movement of said shuttle means from its neutral position, said control means also including feedback means between said movable member and said shuttle means effecting a return of said shuttle means to its neutral position in response to movement of said member thereby maintaining said member in the position selected by said selecting means, said control means also including a fluid chamber operatively connected at times to said selecting means and connecting the fluid from said source to operatively act on a portion of said shuttle means, said shuttle means being movable by the pressure of said latter fluid operatively acting thereon in response to movement of said selector means to one position to effect a movement of said member towards one position.

16. An actuating mechanism as in claim 15, said fluid chamber having fluid inlet means connected thereto independently of said selecting means and containing fluid under pressure from said source for the movement of said shuttle means at times independently of said selecting means, and on-off control means associated with said inlet means and operable to control the supply of fluid to said inlet means.

17. An actuator mechanism as in claim 15, said control means, including other control means connecting the fluid from said source through said selectively movable selecting means to operatively act on a portion of said shuttle means, said shuttle means being movable by the pressure of said latter fluid in response to movement of said selectively movable selecting means to said one position to effect a movement of said member towards its said one position.

18. An actuator mechanism as in claim 15, wherein said control means includes additional means between said source and selecting means movable to a plurality of positions, said additional means in one position permitting a predetermined flow of said source fluid therethrough to said selecting means, and further means for moving said additional means to a second position permitting a greater flow of fluid from said source therethrough to said selecting means to thereby control the variable movement of said member when said selectively movable selecting means is in said one position.

19. An actuator mechanism as in claim 18, wherein said fluid chamber includes a flow restricted fluid vent means whereby the rate of pressure build-up in said chamber against said shuttle valve varies as a function of the flow volume through said additional means.

20. An actuator mechanism as in claim 18, wherein said control means also includes a selectively operable on-off means between said additional means and said selecting means controlling flow of fluid to said shuttle means from said source.

References Cited
UNITED STATES PATENTS

| | | | |
|---|---|---|---|
| 2,912,824 | 11/1959 | Van Nest et al. | 60—39.25 X |
| 3,181,295 | 5/1965 | Pauwels et al. | 60—39.25 X |
| 3,252,686 | 5/1966 | Chadwick | 60—39.25 X |
| 3,290,996 | 12/1966 | Floyd | 91—387 X |

JULIUS E. WEST, *Primary Examiner.*